Aug. 4, 1953    G. C. HARBERT    2,647,289
WINDOW WEATHERSTRIPPING
Filed Aug. 24, 1950

INVENTOR.
George C. Harbert.
BY
Harness, Dickey & Pierce.
ATTORNEYS.

Patented Aug. 4, 1953

2,647,289

UNITED STATES PATENT OFFICE 2,647,289

WINDOW WEATHERSTRIPPING

George C. Harbert, Ann Arbor, Mich., assignor to Kaiser-Frazer Corporation, Willow Run, Mich., a corporation of Nevada Application August 24, 1950, Serial No. 181,234

3 Claims. (Cl. 20—56.4)

This invention relates to mounting and sealing strips for joining panels in end-to-end relation, and especially to window weather stripping for supporting and sealing the windshields of automotive vehicles within the openings defined by the body panels.

It is an object of this invention to provide a windshield weather strip of the class described, together with a garnish molding integral with said weather strip and which will serve to blend the contours of the windshield and the adjacent body panel so as to provide a pleasing and ornamental effect at all points along the windshield edge.

It is also an object to provide a weather strip having a garnish molding as described which upon installation will automatically adjust to all variations in contour of both the body panel and the windshield so as to provide the maximum blending effect at all points along the frame of the windshield.

It is further within my contemplation to provide a windshield weather strip having the above characteristics and which will simultaneously provide a tight sealing grip along the edge of the windshield for firmly supporting it against movement and sealing the edge thereof against air and weather.

It is also an object to provide a weather strip as described above, in which the sealing pressure along the windshield edge is automatically effected upon installation by the coaction of the portions of the weather strip with the body panel and windshield, and in which the entire installation may be accomplished in a single operation without the necessity of additional parts.

It is another object to provide a windshield weather strip as described above which is adapted for receiving an ornamental metallic molding on one side thereof, and in which this molding may be easily and quickly installed after the installation of the windshield.

These and other objects of this invention will become apparent from the following detailed description, taken in conjunction with the accompanying drawings, in which.

Although this invention is described with particular application to the windshields of automotive vehicles, it will be understood that, except as limited by the appended claims, the device is applicable to other mechanisms having similar structure and uses.

Figure 2:
Fig. 2 is a cross-sectional view of the weather strip showing its contour before installation.

The weather strip in its original state and before installation comprises an elongated strip of the contour and section shown in Fig. 2. This strip is preferably manufactured of rubber or similar elastic material, and comprises a base section 11 against which the windshield and body panels abut when in their operative position. This base section may have along its upper and lower surfaces serrated ridges 12 which serve as sealing serrations when the weather strip is installed. Extending upwardly on either side of base section 11 are windshield-engaging lips 13 and 14, forming a channel 15 therebetween for receiving the supported edge of the windshield. These lips are preferably of concave shape and converge upwardly when the weather strip is in its free condition. The outer portion 16 of lip 13 is provided with slots 17 and 18 which are adapted to receive an ornamental metallic molding, as will be later described. Extending downwardly from lip 13 is a cowling toe 19 which serves, when in operative position, to engage the adjacent surface of the body cowling. Extending downwardly along the outer surface of lip 14 is a lip 21 which serves to engage the flanges of the body panel and cowling in a channel 22 formed thereby. As seen in Fig. 2, the arrangement is such that the channels 15 and 22 are in parallel spaced and partially overlapping relation and open in opposite directions. Lip 21 is also concave in shape and converges toward the adjacent side of base section 11.

Spaced from lip 21 and extending downwardly in a curved manner from the upper portion of lip 14 is an elongated wing 23. This wing curves inwardly around lip 21 and in its free condition the lower terminal 23a of the wing is at about the same level as the lower end of lip 19. Wing 23 is preferably of substantially uniform thickness throughout and may be provided in its lower portion with an air space 24 for reducing the amount of material used in manufacturing without impairing the functioning of the device.

Figure 1:
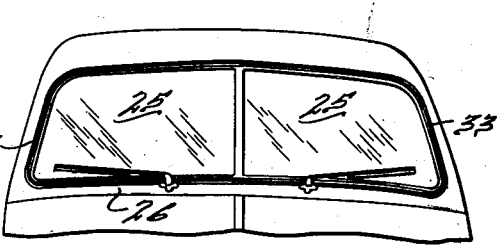
Fig. 1 is a perspective view showing an automotive windshield and the adjacent body panel sections with the windshield weather strip of my invention in operative position.
Figure 3:
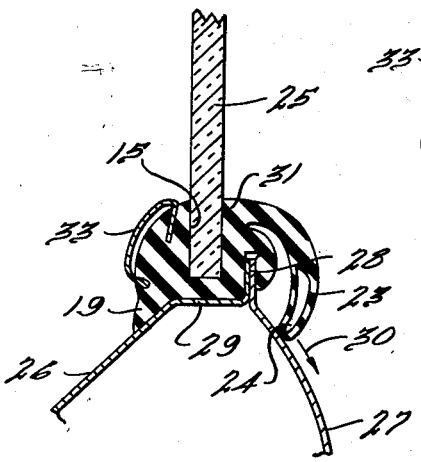
Fig. 3 is a cross-sectional view showing the weather strip in operative position with the windshield mounted on the supporting body panels and with the ornamental molding in position.
Figure 4:
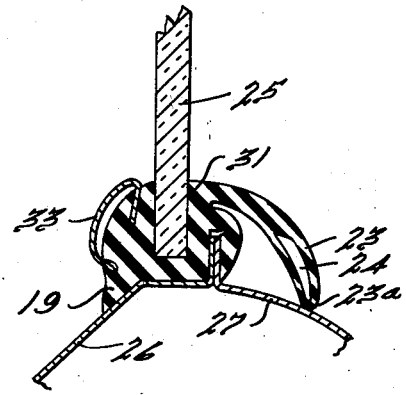
Fig. 4 is a cross-sectional view similar to Fig. 3 but at another point along the mounting, showing a body panel section of different contour than that of Fig. 3.

In operation, the windshield weather strip serves to support a windshield 25 in end-to-end relation with the cowling 26 and an adjacent body panel 27, the cowling and panel being united along their edges to form a flange 28 as shown in Fig. 3 and Fig. 4. In order to install the windshield, the weather strip is first placed around the edge thereof by spreading lips 13 and 14 and inserting the windshield edge in channel 15. It will be observed that since lips 13 and 14 naturally tend to converge, they will grip the edge of windshield 25 to provide an initial sealing action. The lip 21 is then spread and flange 28 is inserted within channel 22, until the horizontal portion 29 of the cowling is flush with the lower surface of base section 11. When this is done, cowling toe 19 will be forced outwardly by the inclined portion of the cowling, the resistive force in the toe providing a sealing action against the cowling surface. Panel 27, which, as seen in Figs. 3 and 4, may be of widely differing contour along its extent, will be forced against the lower terminal 23a of wing 23 as flange 28 is inserted in its channel. Since wing 23 is attached to the weather strip only at its upper end, this action will result in a pivoting movement and a simultaneous flattening of the wing 23, the free end 23a thereof sliding downwardly along the surface of panel 27 in the direction shown by arrow 30 in Fig. 3. The extent of this flattening will depend upon the relative contours of panel 27 and windshield 25. Where the panel 27 has a contour substantially normal to the windshield, as shown in Fig. 4, the sliding and flattening action on wing 23 will be substantially greater than when the panel has a more parallel contour, as shown in Fig. 3. It will be noted that the final radius of curvature of wing 23 will be substantially greater where panel 27 and windshield 25 are nearer to a parallel relation, and that this radius of curvature is lessened in direct proportion to the amount of angularity between the windshield and the panel, thus providing the maximum blending effect at all points along the windshield frame.

It will be observed that when wing 23 is lifted, its pivotal movement will cause inward pressure substantially at the area 31 in the upper corner of windshield lip 14. This action will result in an additional sealing pressure against the windshield edge, since the inward movement of area 31 will be opposed by the opposite windshield lip 13.

After the windshield has been installed, ornamental metallic molding 33 may be inserted in slots 17 and 18, the molding being applied by sliding it lengthwise into the slots. It will be observed that in its final position molding 33 will also serve to apply additional sealing pressure to the windshield through windshield lip 13.

What is claimed is:

1. In a mounting strip for supporting first and second panels in end-to-end relation, a base section, first and second lips extending from the base section in one direction and providing a channel for the reception of said first panel therebetween, a third lip integral with said base section adjacent said second lip extending in the opposite direction from said first and second lips and forming with the adjacent side of said second lip a channel for the reception of said second panel, and a wing having the inner end fixed to said second lip adjacent the outer end thereof extending in the reverse direction from said second lip around said third lip in spaced relation thereto with the outer end thereof adapted for engagement with a portion of said second panel.

2. In a mounting strip for supporting first and second panels in end-to-end relation, a base section, first and second lips extending from the base section in one direction and providing a channel for the reception of said first panel therebetween, a third lip integral with said base section adjacent said second lip extending in the opposite direction from said first and second lips and forming with the adjacent side of said second lip a channel for the reception of said second panel, and a curved wing having the inner end fixed to said second lip adjacent the outer end thereof extending in a reverse direction from said second lip around and beyond the end of said third lip in spaced relation thereto with the outer end thereof adapted for engagement with a portion of said second panel.

3. In a mounting strip for supporting first and second panels in end-to-end relation, a base section, first and second lips extending from the base section in one direction and providing a channel for the reception of said first panel therebetween, a third lip integral with said base section adjacent said second lip extending in the opposite direction from said first and second lips and forming with the adjacent side of said second lip a channel for the reception of said second panel, a wing having the inner end fixed to said second lip adjacent the outer end thereof extending in the reverse direction from said second lip around said third lip in spaced relation thereto with the outer end thereof adapted for engagement with a portion of said second panel, and a toe lip formed integral with said base section adjacent the base of said first lip.

GEORGE C. HARBERT.

References Cited in the file of this patent

UNITED STATES PATENTS

| Number | Name | Date |
|---|---|---|
| 1,961,352 | Hall | June 5, 1934 |
| 2,204,769 | Potter | June 18, 1940 |
| 2,497,276 | Scott et al. | Feb. 14, 1950 |

FOREIGN PATENTS

| Number | Country | Date |
|---|---|---|
| 620,325 | Great Britain | Mar. 23, 1949 |